(12) United States Patent
Takeuchi (10) Patent No.: US 11,633,769 B2
(45) Date of Patent: Apr. 25, 2023

(54) CHASSIS FOR SMALL ELECTRONIC DEVICE AND METHOD FOR FORMING SAME, AND ROLLED ALUMINUM ALLOY LAMINATED SHEET MATERIAL FOR CHASSIS FOR SMALL ELECTRONIC DEVICE

(71) Applicant: Resonac Packaging Corporation, Hikone (JP)

(72) Inventor: Masanori Takeuchi, Isehara (JP)

(73) Assignee: RESONAC PACKAGING CORPORATION, Hikone (JP)

( * ) Notice: Subject to any disclaimer, the term of this patent is extended or adjusted under 35 U.S.C. 154(b) by 0 days.

(21) Appl. No.: 15/333,200

(22) Filed: Oct. 25, 2016

(65) Prior Publication Data

US 2017/0113255 A1 Apr. 27, 2017

(30) Foreign Application Priority Data

Oct. 27, 2015 (JP) .............................. JP2015-211179
Sep. 15, 2016 (JP) .............................. JP2016-180193

(51) Int. Cl.
*B21C 1/00* (2006.01)
*B32B 7/12* (2006.01)
(Continued)

(52) U.S. Cl.
CPC ............... *B21C 1/003* (2013.01); *B21B 3/00* (2013.01); *B21D 22/203* (2013.01); *B32B 1/02* (2013.01);
(Continued)

(58) Field of Classification Search
CPC ......... C22C 21/06; C22C 38/06; C22C 38/04; B32B 27/36; B32B 27/08; B32B 2309/105; B32B 15/20; B32B 2255/26
See application file for complete search history.

(56) References Cited

U.S. PATENT DOCUMENTS 2,865,765 A * 12/1958 Allen .................... A23B 7/0433
426/393
4,340,519 A * 7/1982 Kotera .................... C08L 67/02
260/DIG. 38
(Continued)

FOREIGN PATENT DOCUMENTS

CN 1337311 2/2002
CN 1337311 A * 2/2002
(Continued)

OTHER PUBLICATIONS

Translation—JP2012246555A; Dec. 2012; Shinji et al (Year: 2012).*
(Continued)

*Primary Examiner* — Humera N. Sheikh
*Assistant Examiner* — Elizabeth D Ivey
(74) *Attorney, Agent, or Firm* — Mori & Ward, LLP (57) ABSTRACT

To provide a chassis for a small electronic device that can be formed efficiently by drawing work with low cost, is hard to cause forming failure, and causes no damage on the surface thereof on forming to provide an excellent appearance. The rolled aluminum alloy laminated sheet material is for forming a chassis for a small electronic device by drawing work, and contains a rolled aluminum alloy sheet material having a 0.2% proof stress of 200 MPa or more, and a covering material laminated at least one surface of both surfaces of the rolled aluminum alloy sheet material, and the covering material contains any one of a synthetic resin film, and a laminated material containing a metal foil having synthetic resin films laminated on both surfaces thereof. The rolled aluminum alloy sheet material may have a fibrous crystalline structure extending in a direction perpendicular to a thickness direction thereof.

17 Claims, 6 Drawing Sheets

(51) Int. Cl.
| | |
|---|---|
| *B32B 15/085* | (2006.01) |
| *B32B 15/088* | (2006.01) |
| *B32B 15/09* | (2006.01) |
| *B32B 15/20* | (2006.01) |
| *C22C 21/02* | (2006.01) |
| *C22C 21/08* | (2006.01) |
| *C22C 21/10* | (2006.01) |
| *C22F 1/043* | (2006.01) |
| *B21D 22/20* | (2006.01) |
| *B32B 27/32* | (2006.01) |
| *B32B 1/02* | (2006.01) |
| *B32B 15/08* | (2006.01) |
| *B32B 27/34* | (2006.01) |
| *B32B 3/02* | (2006.01) |
| *B32B 27/28* | (2006.01) |
| *B32B 15/18* | (2006.01) |
| *B32B 27/36* | (2006.01) |
| *B21B 3/00* | (2006.01) |
| *C22F 1/047* | (2006.01) |
| *C22F 1/053* | (2006.01) |

(52) U.S. Cl.
CPC .................. *B32B 3/02* (2013.01); *B32B 7/12* (2013.01); *B32B 15/08* (2013.01); *B32B 15/085* (2013.01); *B32B 15/088* (2013.01); *B32B 15/09* (2013.01); *B32B 15/18* (2013.01); *B32B 15/20* (2013.01); *B32B 27/281* (2013.01); *B32B 27/32* (2013.01); *B32B 27/34* (2013.01); *B32B 27/36* (2013.01); *C22C 21/02* (2013.01); *C22C 21/08* (2013.01); *C22C 21/10* (2013.01); *C22F 1/043* (2013.01); *C22F 1/047* (2013.01); *C22F 1/053* (2013.01); *B21B 2003/001* (2013.01); *B32B 2250/05* (2013.01); *B32B 2250/40* (2013.01); *B32B 2307/50* (2013.01); *B32B 2307/518* (2013.01); *B32B 2307/54* (2013.01); *B32B 2307/732* (2013.01); *B32B 2307/748* (2013.01); *B32B 2439/02* (2013.01); *B32B 2457/00* (2013.01)

(56) References Cited

U.S. PATENT DOCUMENTS

| | | | | |
|---|---|---|---|---|
| 5,302,344 A | * | 4/1994 | Perlman | A61L 2/26 |
| | | | | 220/62.22 |
| 2004/0029001 A1 | * | 2/2004 | Yamazaki | H01M 50/116 |
| | | | | 429/176 |
| 2007/0138239 A1 | * | 6/2007 | Kumagai | B23K 20/24 |
| | | | | 228/227 |
| 2007/0202325 A1 | * | 8/2007 | Huminori | C08J 5/18 |
| | | | | 428/343 |
| 2007/0264457 A1 | * | 11/2007 | Matsushita | B32B 7/06 |
| | | | | 428/41.6 |
| 2010/0215926 A1 | * | 8/2010 | Askin | C25D 11/18 |
| | | | | 428/209 |
| 2013/0209816 A1 | * | 8/2013 | Kobayashi | C08L 23/04 |
| | | | | 428/483 |
| 2013/0244030 A1 | * | 9/2013 | Igarashi | C09J 125/08 |
| | | | | 428/355 EN |
| 2015/0132181 A1 | * | 5/2015 | Anderson | C22C 21/06 |
| | | | | 420/532 |

FOREIGN PATENT DOCUMENTS

| | | | | |
|---|---|---|---|---|
| JP | 63297543 A | * | 12/1988 | |
| JP | 2000345270 A | * | 12/2000 | |
| JP | 2003-94555 | | 4/2003 | |
| JP | 2010-236036 | | 10/2010 | |
| JP | 2012-246555 | | 12/2012 | |
| JP | 2012246555 A | * | 12/2012 | ............. C22C 21/00 |
| JP | 2014-151343 | | 8/2014 | |

OTHER PUBLICATIONS

Bib Data and Translation of CN-1337311-A; Takaichi Tsukunaka; Feb. 2002 (Year: 2002).*

Bib data and translation; JP-2000345270-A; Kawai, Hitoshi; Dec. 2000 (Year: 2000).*

Bib Data and Translation—JP-63297543-A; Dec. 5, 1988 (Year: 1988).*

Handbook of Thermoplastic Elastomers (Second Edition); Ch 4: Process ING M ETHODS APPLICA BLE to T HERMOPLASTIC Elastomers; J iri George Drobny; p. 141 2014 https://www.sciencedirect.com/science/article/pii/B9780323221368000041; (Year: 2014).*

Taiwanese Office Action for corresponding TW Application No. 105132391, dated Dec. 11, 2018.

Chinese Office Action for corresponding CN Application No. 201610947840.8, dated May 30, 2019 (w/ English machine translation).

Japanese Office Action for corresponding JP Application No. 2016-180193, dated Jul. 28, 2020 (w/ English machine translation).

Chinese Office Action for corresponding CN Application No. 201610947840.8, dated Oct. 8, 2018.

* cited by examiner

CHASSIS FOR SMALL ELECTRONIC DEVICE AND METHOD FOR FORMING SAME, AND ROLLED ALUMINUM ALLOY LAMINATED SHEET MATERIAL FOR CHASSIS FOR SMALL ELECTRONIC DEVICE

BACKGROUND OF INVENTION

Field of Invention

The present invention relates to a chassis for a small electronic device, such as a tablet terminal, a portable communication terminal device, a notebook computer, a portable telephone, a portable music device, and a digital camera, and a method for forming the same, and a rolled aluminum alloy laminated sheet material used as a material for forming a chassis of a small electronic device.

Related Art

There has been known a chassis for a small electronic device that is formed by cutting work (overall cutting) of a thick plate of an extruded aluminum alloy material (see, for example, PTL 1).

The chassis has been favorably used as a chassis for a small electronic device due to the excellent appearance, accuracy, and strength thereof.

As a measure for forming a product having a prescribed shape from a metal sheet material, such as an aluminum alloy sheet material, drawing work has been generally performed widely.

CITATION LIST

PTL 1: JP-A-2012-246555

SUMMARY OF INVENTION

Technical Problem

However, a chassis for a small electronic device that is formed by cutting work has a problem of increased cost since the formation efficiency is deteriorated because a prolonged period of time is required for the cutting work of materials, and a large amount of cutting dust is formed on cutting, which requires a large amount of energy for recovering the cutting dust.

In the drawing work, on the other hand, excellent formation efficiency is obtained since the forming is performed in a short period of time, and since no dust is formed on working, it is possible to provide a product at low cost. However, a chassis for a small electronic device generally has a shape that has a bottom wall having an approximately rectangular shape in the plan view and a side wall rising from the periphery of the bottom wall. In the case where the chassis having such a shape is to be formed by drawing work, forming failure is liable to occur due to cracking on the corner portion of the side wall.

Furthermore, in the drawing work, a surface of the metal sheet material is in contact with a metal mold under sliding, and thereby the surface of the formed article may be damaged to deteriorate the appearance of the product.

An object of the invention is to provide a chassis for a small electronic device that can be formed efficiently by drawing work with low cost, is hard to cause forming failure, and causes no damage on the surface thereof on forming to provide an excellent appearance.

Solution to Problem

For achieving the aforementioned and other objects, one aspect of the invention provides the following embodiments.

(1) A rolled aluminum alloy laminated sheet material for a chassis for a small electronic device, for forming a chassis for a small electronic device by drawing work, containing a rolled aluminum alloy sheet material having a 0.2% proof stress of 200 MPa or more, and a covering material laminated at least one surface of both surfaces of the rolled aluminum alloy sheet material, the covering material containing any one of a synthetic resin film, and a laminated material containing a metal foil having synthetic resin films laminated on both surfaces thereof.

(2) The rolled aluminum alloy laminated sheet material for a chassis for a small electronic device according to the item (1), wherein the rolled aluminum alloy sheet material has a fibrous crystalline structure extending in a direction perpendicular to a thickness direction thereof.

(3) The rolled aluminum alloy laminated sheet material for a chassis for a small electronic device according to the item (1) or (2), wherein the rolled aluminum alloy sheet material contains an aluminum alloy containing any one of an Al—Mn—Mg alloy containing from 0.2 to 0.7% by mass of Mn and from 2.0 to 5.0% by mass of Mg, with the balance of Al and unavoidable impurities, an Al—Si—Mg alloy containing from 0.2 to 0.8% by mass of Si and from 0.4 to 1.2% by mass of Mg, with the balance of Al and unavoidable impurities, and an Al—Zn—Mg alloy containing from 4.0 to 6.5% by mass of Zn and from 0.5 to 3.0% by mass of Mg, with the balance of Al and unavoidable impurities.

(4) The rolled aluminum alloy laminated sheet material for a chassis for a small electronic device according to any one of the items (1) to (3), wherein the covering material has a thickness that is from 0.05 to 1.5 times a thickness of the rolled aluminum alloy sheet material.

(5) The rolled aluminum alloy laminated sheet material for a chassis for a small electronic device according to any one of the items (1) to (4), wherein the rolled aluminum alloy sheet material has a thickness of from 0.5 to 3.5 mm.

(6) The rolled aluminum alloy laminated sheet material for a chassis for a small electronic device according to any one of the items (1) to (5), wherein the covering material laminated on the surface of the rolled aluminum alloy sheet material that is to be an outer surface of the small electronic device contains a polyester resin film or a polyamide resin film having a thickness of from 50 to 100 μm.

(7) The rolled aluminum alloy laminated sheet material for a chassis for a small electronic device according to any one of the items (1) to (6), wherein the covering material laminated on the surface of the rolled aluminum alloy sheet material that is to be an inner surface of the small electronic device contains a polyethylene resin film, a polypropylene resin film, or a polyamide resin film having a thickness of from 10 to 100 μm.

(8) A chassis for a small electronic device having a covering material, containing the rolled aluminum alloy laminated sheet material for a chassis for a small electronic device according to any one of the items (1) to (7) having been subjected to drawing work, the covering material containing a synthetic resin film or a laminated material covering at least one of inner and outer surfaces of the chassis.

(9) A chassis for a small electronic device, containing the rolled aluminum alloy laminated sheet material for a chassis for a small electronic device according to any one of the items (1) to (7) having been subjected to drawing work, from which a covering material covering at least one of inner and outer surfaces of the chassis has been removed.

(10) The chassis for a small electronic device according to the item (9), wherein the chassis contains a bottom wall and a side wall rising from a periphery of the bottom wall, and the side wall has a height of from 0.5 to 25 mm, and has an angle with respect to the bottom wall of from 90 to 150°.

(11) A method for forming a chassis for a small electronic device, containing subjecting the rolled aluminum alloy laminated sheet material for a chassis for a small electronic device according to anyone of the items (1) to (7) to drawing work.

Advantageous Effects of Invention

According to the rolled aluminum alloy laminated sheet material for a chassis for a small electronic device of the item (1), the rolled aluminum alloy sheet material as a material for the chassis has a 0.2% proof stress of 200 MPa or more. Therefore, the desired strength of the chassis can be ensured.

According to the rolled aluminum alloy laminated sheet material of the item (1), furthermore, the covering material having a small frictional resistance containing a synthetic resin film or a laminated material containing a metal foil having synthetic resin films laminated on both surfaces thereof is laminated at least one surface of both surfaces of the rolled aluminum alloy sheet material. Therefore, wrinkles on the side wall of the chassis formed by drawing work and cracks on the corner portion of the side wall are not formed to suppress the occurrence of forming failure, and damages on the surface of the chassis due to the contact with the metal mold is prevented to retain the appearance of the chassis undamaged.

According to the rolled aluminum alloy laminated sheet material for a chassis for a small electronic device of the item (2), the rolled aluminum alloy sheet material has a fibrous crystalline structure extending in the direction perpendicular to the thickness direction thereof. Therefore, the sheet material has a high strength against bending, and thereby preventing forming failure including wrinkles and cracks.

According to the rolled aluminum alloy laminated sheet material for a chassis for a small electronic device of the item (3), the rolled aluminum alloy sheet material contains any one of aluminum alloys among an Al—Mn—Mg alloy, an Al—Si—Mg alloy, and an Al—Zn—Mg alloy. Therefore, forming by drawing work is favorably performed, and thereby the chassis obtained has high accuracy and strength and an excellent appearance.

According to the rolled aluminum alloy laminated sheet material for a chassis for a small electronic device of the item (4), the covering material has a thickness that is from 0.05 to 1.5 times the thickness of the rolled aluminum alloy sheet material, and therefore the following problems can be avoided.

When the thickness of the covering material is less than 0.05 times the thickness of the rolled aluminum alloy sheet material, the covering material may be broken, and the formed article may be damaged at the position in contact with the metal mold due to the breakage of the covering material. When the thickness of the covering material exceeds 1.5 times the thickness of the rolled aluminum alloy sheet material, the farther effect may not be obtained, but the cost may be increased.

According to the rolled aluminum alloy laminated sheet material for a chassis for a small electronic device of the item (5), the rolled aluminum alloy sheet material has a thickness of from 0.5 to 3.5 mm, and therefore the following problems can be avoided.

When the thickness of the rolled aluminum alloy sheet material is less than 0.5 mm, the strength of the final product may be insufficient. When the thickness of the rolled aluminum alloy sheet material exceeds 3.5 mm, the curvature radius (R) of the bent portion and the corner portion may be too large.

According to the rolled aluminum alloy laminated sheet material for a chassis for a small electronic device of the item (6), the following effects may be obtained. Specifically, in the formation of a chassis for a small electronic device by drawing work of the rolled aluminum alloy laminated sheet material, the surface thereof to be the outer surface of the chassis for a small electronic device is partially drawn with a metal mold. By using a polyester resin film or a polyamide resin film having a thickness of from 50 to 100 μM is used as the covering material that covers the surface, the covering material may not be broken by the ironing with the metal mold to prevent reliably the surface of the formed article from being damaged, and the increase in cost due to the too large thickness of the film can be prevented. Furthermore, the uplift or release of the film from the bent portion of the chassis due to the too large rigidity of the film can be prevented.

According to the rolled aluminum alloy laminated sheet material for a chassis for a small electronic device of the item (7), the following effects may be obtained. Specifically, in the formation of a chassis for a small electronic device by drawing work of the rolled aluminum alloy laminated sheet material, the surface thereof to be the inner surface of the chassis for a small electronic device is not drawn by a metal mold, but has a portion that is bent to form in a concave direction. When a polyethylene resin film, a polypropylene resin film, or a polyamide resin film having a thickness of from 10 to 100 μm is used as the covering material that covers the surface, the uplift or release of the film from the bent portion of the chassis due to the too large rigidity of the film can be prevented, and the failure of providing a sharp shape due to the increased curvature radius (R) in the bent portion of the chassis can also be prevented.

According to the chassis for a small electronic device having a covering material of the item (8), the drawing work for forming the rolled aluminum alloy sheet material can be favorably performed, and the surface thereof can be prevented from being damaged on forming. Therefore, a chassis that has high accuracy and strength and excellent appearance can be obtained.

According to the chassis for a small electronic device having a covering material of the item (8), furthermore, the surface of the chassis is being covered with the covering material. Therefore, the surface of the chassis can be prevented from being damaged in storage, transportation and the like thereof.

According to the chassis for a small electronic device of the item (9), the drawing work for forming the rolled aluminum alloy sheet material can be favorably performed, and the surface of the chassis can be prevented from being damaged in forming, storage, and transportation thereof. Therefore, a chassis that has high accuracy and strength and excellent appearance can be obtained.

According to the chassis for a small electronic device of the item (10), the chassis has the side wall having a height of from 0.5 to 25 mm and an angle with respect to the bottom wall of from 90 to 150°, and therefore the following problems can be avoided.

When the height of the side wall is less than 0.5 mm, the portion to be cut in the subsequent step may be large. The height of the side wall that exceeds 25 mm is not preferred since the thickness of the small electronic device may be large.

When the angle of the side wall with respect to the bottom wall is less than 90°, i.e., the side wall is inclined inward, the work may be difficult to perform due to wrinkles formed on the corner portion. When the angle of the side wall with respect to the bottom wall exceeds 150°, the depth of the chassis may be small to decrease the housing capacity for the components of the small electronic device may be small.

According to the method for forming a chassis for a small electronic device of the item (11), a chassis for a small electronic device that has high accuracy and strength and excellent appearance can be formed efficiently at low cost by drawing work.

DESCRIPTION OF EMBODIMENTS

The embodiments of the invention will be described with reference to FIGS. 1A to 8 below.

Figure 1A:
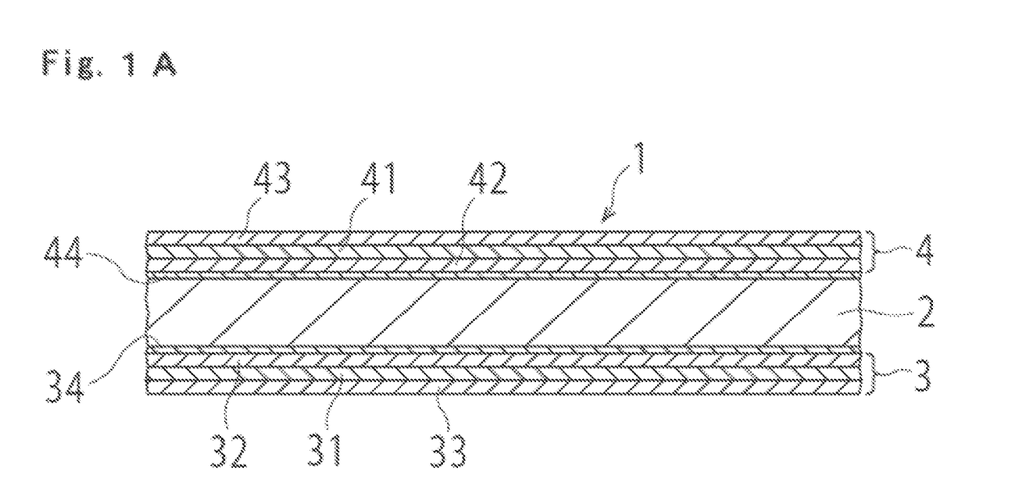
FIGS. 1A and 1B are partial enlarged cross sectional views showing an example of the layer structure of the rolled aluminum alloy laminated sheet material for a chassis for a small electronic device according to the invention.
Figure 1B:
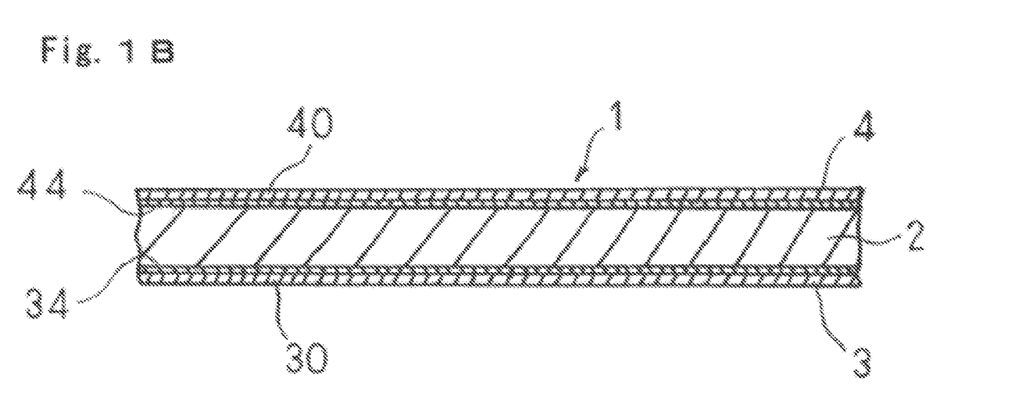

FIGS. 1A and 1B show the layer structure of the rolled aluminum alloy laminated sheet material (1) for a chassis for a small electronic device according to the invention.

As shown in the figures, the rolled aluminum alloy laminated sheet material (1) for a chassis for a small electronic device contains a rolled aluminum alloy sheet material (2) and covering materials (3) and (4) laminated on both surfaces of the rolled aluminum alloy sheet material (2).

The rolled aluminum alloy sheet material (2) has a 0.2% proof stress of 200 MPa or more, preferably 250 MPa or more, and more preferably 300 MPa or more, and thereby the chassis having a desired strength can be obtained. The rolled aluminum alloy sheet material (2) preferably has a breaking elongation of 5% or more and 20% or less, and thereby the formability in the drawing work may be enhanced. The "0.2% proof stress" and the "breaking elongation" herein are measured by a tensile test in a direction in parallel to the rolling direction using the No. 5 test piece defined in JIS Z2241-2011.

The rolled aluminum alloy sheet material (2) may have a fibrous crystalline structure extending in a direction perpendicular to the thickness direction thereof.

The fibrous crystalline structure may be formed in such a manner that an aluminum alloy ingot having been homogenized is subjected to hot rolling, then a heat treatment under prescribed condition, and then cold rolling. The heat treatment is performed by retaining the temperature of from 200 to 400° C. for 1 hour or more. The heat treatment can deposit $Mg_2Si$ finely and homogeneously, and can reduce the processing strain remaining in the rolled material. Thereafter, the material is work-hardened by the subsequent cold working, thereby providing the rolled aluminum alloy sheet material having a high strength within such a range that does not impair the subsequent formability.

The condition for the homogenization treatment of the aluminum alloy ingot is not particularly limited, and the homogenization treatment is preferably performed according to an ordinary method at 500° C. or more for 2 hours or more.

In the hot rolling, an effect equivalent to quenching is obtained by the temperature reduction during the rolling under the prescribed temperature condition in an arbitrary pass thereof. Accordingly, the temperature of the material before the pass is necessarily such a temperature that is capable of retaining the state where Mg and Si are dissolved, which may be from 350 to 440° C. For achieving the temperature immediately after the pass within the aforementioned temperature range of from 200 to 400° C., the rolled material immediately after the hot rolling may be forcedly cooled, for example, high-pressure water shower cooling. For providing the quenching effect, the cooling rate between the passes may be 50° C. per minute or more, the temperature immediately after the pass may be from 250 to 340° C., the pass rolling speed may be 50 m/min or more, and the thickness after the pass may be 10 mm or less.

In the cold rolling, the rolling reduction may be 30% or more for providing the prescribed strength through work hardening. The rolling reduction is preferably 50% or more.

The alloy sheet having been subjected to the cold rolling may further be subjected to final annealing at a temperature of from 130 to 150° C. depending on necessity. The heat treatment at a low temperature may further enhance the strength through age hardening, and may also enhance the elongation. The heat treatment may also have an effect of stabilizing the various mechanical properties.

The rolled aluminum alloy sheet material (2) preferably contains any one of the following aluminum alloys:

(i) an Al—Mn—Mg alloy containing from 0.2 to 0.7% by mass of Mn and from 2.0 to 5.0% by mass of Mg, with the balance of Al and unavoidable impurities, (ii) an Al—Si—Mg alloy containing from 0.2 to 0.8% by mass of Si and from 0.4 to 1.2% by mass of Mg, with the balance of Al and unavoidable impurities, and (iii) an Al—Zn—Mg alloy containing from 4.0 to 6.5% by mass of Zn and from 0.5 to 3.0% by mass of Mg, with the balance of Al and unavoidable impurities.

Examples of the alloy (i) include an aluminum alloy containing 0.4% by mass or less of Si, from 0.4 to 0.6% by mass of Mn, from 4.0 to 4.9% by mass of Mg, 0.4% by mass or less of Fe, from 0.05 to 0.25% by mass of Cr, and 0.25% by mass or less of Zn, with the balance of Al and unavoidable impurities.

Examples of the alloy (ii) include an aluminum alloy containing from 0.2 to 0.6% by mass of Si, from 0.45 to 0.9% by mass of Mg, 0.35% by mass or less of Fe, 0.1% by mass or less of Cr, and 0.1% by mass or less of Zn, with the balance of Al and unavoidable impurities.

Examples of the alloy (iii) include an aluminum alloy containing 0.4% by mass or less of Si, from 2.1 to 2.9% by mass of Mg, 0.5% by mass or less of Fe, from 1.2 to 2.0% by mass of Cu, 0.3% by mass or less of Mn, from 0.18 to 0.28% by mass of Cr, and from 5.1 to 6.1% by mass of Zn, with the balance of Al and unavoidable impurities.

Among these, the rolled aluminum alloy sheet material (2) that contains an aluminum alloy containing from 0.2 to 0.6% by mass of Si, from 0.45 to 0.9% by mass of Mg, 0.35% by mass or less of Fe, 0.1% by mass or less of Cr, and 0.1% by mass or less of Zn, with the balance of Al and unavoidable impurities is preferred as a material for forming the chassis for a small electronic device.

The thickness of the rolled aluminum alloy sheet material (2) may be appropriately determined depending on the forming condition, the size of the chassis as a formed article, and the like, and is preferably from 0.5 to 3.5 mm, and more preferably from 0.8 to 1.2 mm.

The covering materials (3) and (4) enhance the formability of the rolled aluminum alloy sheet material (2) in drawing work, reduce the amount of the lubricant used on forming, prevent the surface of the sheet material (2) from being damaged on forming, and after forming the chassis, protect the surface of the chassis, for example, in storage and transportation thereof.

Examples of the covering materials (3) and (4) include laminated materials (3) and (4) each containing a metal foil (31) or (41) having laminated on both surfaces thereof synthetic resin films (32) and (33) or (42) or (43), as shown in FIG. 1A, and synthetic resin films (30) and (40), as shown in FIG. 1B.

In the rolled aluminum alloy laminated sheet material (1) for a chassis for a small electronic device according to a first embodiment of the invention shown in FIG. 1A, examples of the aluminum foils (31) and (41) of the laminated materials (3) and (4) constituting the covering materials include an aluminum foil, a stainless steel foil, and a copper foil. Examples of the synthetic resin films (32), (33), (42), and (43) of the laminated materials (3) and (4) include an unstretched polypropylene resin film (CPP), a polyethylene terephthalate resin film (PET), a nylon resin film (Ny), a polyimide resin film (PI), and a polyethylene resin film (PE), and also include stretched films thereof. The metal foils (31) and (41) may be laminated with the synthetic resin films (32), (33), (42), and (43) through an adhesive layer (which is not shown in the figure) containing, for example, a poly (ester-urethane) resin (PAUR), an acrylic resin, an acid-modified polyolefin resin, or the like, and a curing agent.

In the rolled aluminum alloy laminated sheet material (1) for a chassis for a small electronic device according to a second embodiment of the invention shown in FIG. 1B, examples of the synthetic resin films (30) and (40) constituting the covering materials (3) and (4) include a polypropylene resin film, a polyester resin film, a polyamide resin film, a polyimide resin film, and a polyethylene resin film, and any of a biaxially stretched polyethylene terephthalate resin film (PET), a biaxially stretched nylon resin film (ONy), polyethylene resin film, a biaxially stretched polyamide resin film, a biaxially stretched polypropylene resin film (OPP), an unstretched polypropylene resin film (CPP), and an unstretched nylon resin film (CNy) is preferably used.

The covering material (3) that is laminated on the surface of the rolled aluminum alloy sheet material (2) to be the outer surface of the chassis for a small electronic device of the both surfaces thereof (which is the lower surface in FIG. 1B) is preferably a synthetic resin film (30) having a thickness of from 10 to 200 μm, and the covering material (4) that is laminated on the surface thereof to be the inner surface of the chassis for a small electronic device (which is the upper surface in FIG. 1B) is preferably a synthetic resin film (40) having a thickness of from 10 to 100 μm.

The covering material (3) that is laminated on the surface of the rolled aluminum alloy sheet material (2) to be the outer surface of the chassis for a small electronic device of the both surfaces thereof (which is the lower surface in FIG. 1B) is more preferably constituted by a polyester resin film or a polyamide resin film having a thickness of from 50 to 100 μm, and is further preferably constituted by a biaxially stretched polyethylene terephthalate resin film (PET), a biaxially stretched polyethylene naphthalate resin film (PEN), or a biaxially stretched 6-nylon resin film (ONy) having a thickness of from 50 to 100 μm (30). The film (30) may have a tensile strength of from 180 to 330 MPa and a tensile breaking elongation of from 80 to 180%. In particular, the film (30) having a ratio MD/TD in tensile strength or tensile breaking elongation in a range of from 0.8 to 1.2 is preferably used.

The covering material (4) that is laminated on the surface of the rolled aluminum alloy sheet material (2) to be the inner surface of the chassis for a small electronic device of the both surfaces thereof (which is the upper surface in FIG. 1B) is preferably constituted by a polyethylene resin film, a polypropylene resin film, or a polyamide resin film having a thickness of from 10 to 100 μm (more preferably from 20 to 80 μm), and is further preferably constituted by an unstretched polyethylene resin film, an unstretched polypropylene resin film (CPP), a stretched polypropylene resin film (OPP), or a stretched nylon resin film (ONy) (40). The film (40) preferably has a Young's modulus of from 30 to 400 MPa.

The covering material may be laminated on at least one surface, more specifically the surface constituting the outer surface of the chassis, of the both surfaces of the rolled aluminum alloy sheet material (2), and is preferably laminated on the both surfaces of the rolled aluminum alloy sheet material (2) as shown in FIGS. 1A and 1B from the standpoint of the enhancement of the formability and the protection of the surface of the chassis during forming and after forming.

In the case where the covering materials are laminated on the both surfaces of the rolled aluminum alloy sheet material (2), the two covering materials laminated on the surfaces may be the same as each other or may be different from each other in material and/or thickness.

In the case where the bending strength of the rolled aluminum alloy sheet material (2) is small or the case where the thickness thereof is small, the synthetic resin film (30) or (40) may be used as the covering material (as shown in FIG. 1B), and in the case where the bending strength of the rolled aluminum alloy sheet material (2) is large or the case where the thickness thereof is large, the covering material is preferably constituted by the laminated material (3) or (4) (as shown in FIG. 1A) since the synthetic resin film used as the covering material may be broken during drawing to cause wrinkles on the surface of the formed article.

The covering material (3) or (4) is preferably laminated on the surface of the rolled aluminum alloy sheet material (2) through an adhesive layer (34) or (44) as shown in FIG. 1B in consideration of the necessity of removal of the covering material (3) or (4) from the surface after forming the chassis. The adhesive layer (34) or (44) used may be a urethane adhesive, an acrylic adhesive, or a rubber adhesive. The adhesive force of the adhesive layer (34) or (44) to the rolled aluminum alloy sheet material (2) is preferably from 0.5 to 15 N/25 mm (more preferably from 1 to 10 N/25 mm). The "adhesive force" herein is expressed by the 180° peeling adhesive force according to JIS 20237:2000. When the adhesive force of the adhesive layer (34) or (44) is less than 0.5 N/25 mm, the covering material (3) or (4) is liable to be released unintentionally from the rolled aluminum alloy sheet material (2) on handling the rolled aluminum alloy laminated sheet material (1) before forming the chassis, and the like, and when the adhesive force of the adhesive layer (34) or (44) exceeds 15 N/25 mm, the workability on releasing and removing the covering material (3) or (4) after forming the chassis may be deteriorated, and the adhesive may partially remain on the surface of the chassis to cause a problem in the subsequent process steps, such as polishing.

The thickness of the covering material (3) or (4) is preferably from 0.05 to 1.5 times the thickness of the rolled aluminum alloy sheet material (2), and more preferably from 0.2 to 1.0 time the thickness thereof.

Figure 2A:
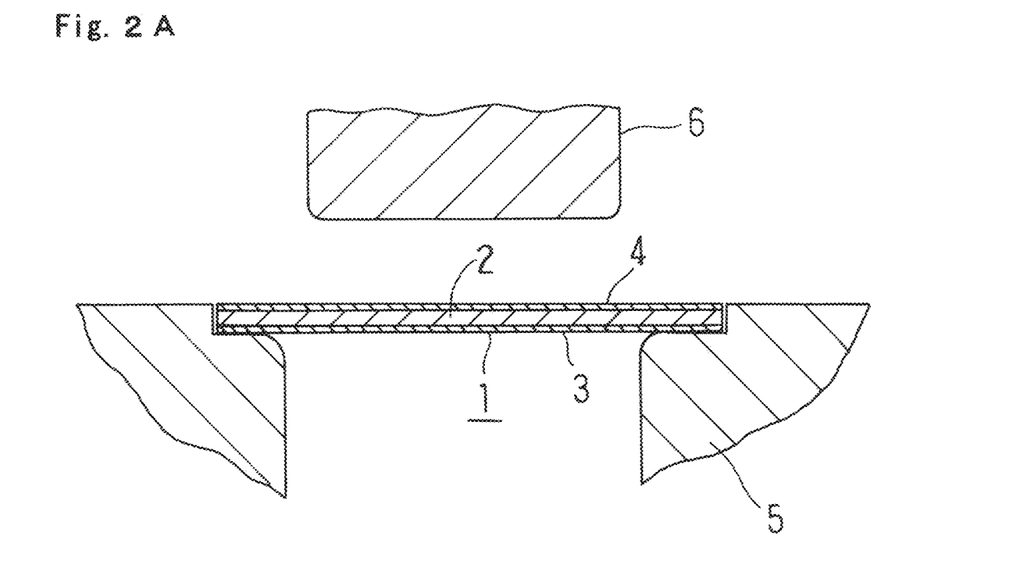
FIGS. 2A and 2B are vertical cross sectional views showing an example of the sequence of the process for forming a chassis for a small electronic device by drawing work of the sheet material.
Figure 2B:
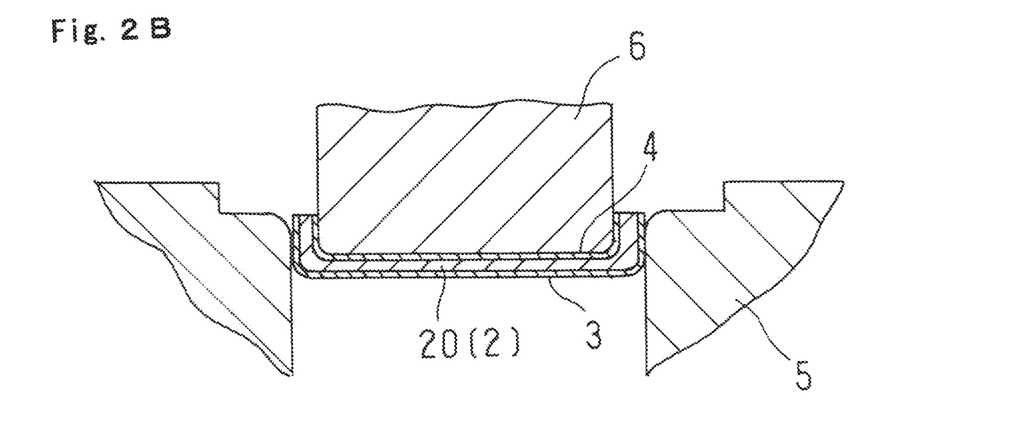

FIGS. 2A and 2B show the process for molding a chassis for a small electronic device by drawing work of the rolled aluminum alloy laminated sheet material (1).

The rolled aluminum alloy laminated sheet material (1) having been cut into an approximately rectangular shape having a prescribed dimension is placed on a lower fixed female die (5) of a metal mold (see FIG. 2A). At this time, a lubricant containing, for example, a silicone lubricant, a mineral oil, or a synthetic petroleum lubricant is preferably coated on at least the lower surface to be the outer surface of the chassis, of the both upper and lower surfaces of the rolled aluminum alloy laminated sheet material (1) i.e., the surface of the lower covering material (3), and thereby the formability may be further enhanced.

By moving downward an upper movable male die (punch) (6) of the metal mold, the part of the rolled aluminum alloy laminated sheet material (1) except for the peripheral portion thereof is pressed downward with a tip and portion of the male die (6), whereby the linear portion of the peripheral portion is bent upward, and simultaneously the corner portion of the peripheral portion is drawn (see FIG. 2B). At this time, the rolled aluminum alloy sheet material (2) is covered with the covering materials (3) and (4) on the both surfaces thereof, and thus is prevented from being wrinkled, and consequently no crack is formed. The surfaces of the rolled aluminum alloy sheet material (2) are not in direct contact with the female die (5) and the male die (6), and thus are not damaged by rubbing.

The chassis (20) for a small electronic device having the covering materials (3) and (4) is thus obtained in this manner. The surfaces of the chassis (20) for a small electronic device are covered with the covering materials (3) and (4), and thus are maintained in a good condition without damage due to the contact with other materials, for example, in storage and transportation thereof.

Figure 3:
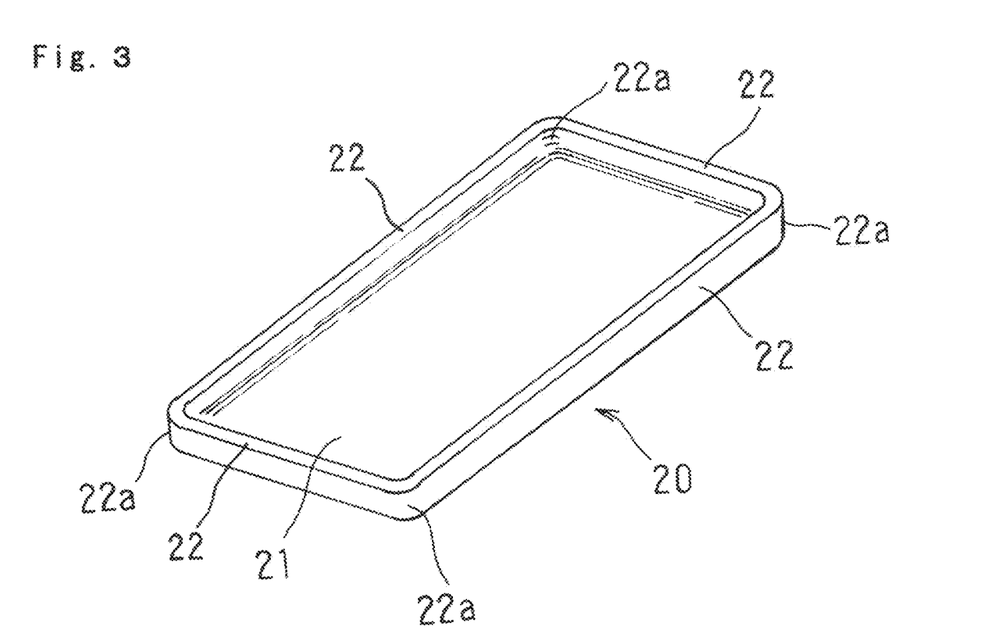
FIG. 3 is a perspective view showing an example of the chassis for a small electronic device according to the invention.

FIG. 3 shows the chassis (20) for a small electronic device. The chassis (20) is obtained by releasing and removing the covering materials (3) and (4) from the inner and outer surfaces of the chassis (20) for a small electronic device having the covering materials (3) and (4), then partially cutting for final forming, and then subjecting the surface thereof to an alumite treatment.

The chassis (20) for a small electronic device has a bottom wall (21) having an approximately rectangular shape in the plan view and four side walls (22) rising from the four edges of the bottom wall (21). The edges of the side walls (22) adjacent to each other are continuous, and the bottom wall (21) is surrounded by the four side walls (22).

The height of the side wall (22) (which is the forming height) may be from 0.5 to 25 mm, preferably from 1 to 15 mm, and more preferably from 2 to 10 mm.

The angle of the side wall (22) with respect to the bottom wall (21) may be from 90 to 150° (approximately 90° in the figure), preferably from 90 to 120°, and more preferably from 90 to 100°.

The boundary between the bottom wall (21) and the side wall (22) has a curvature, and the corner portion (22a) of the side wall (22) also has a curvature. In the portions having a curvature, the fibrous crystalline structure extends along the curvature.

The fibrous crystalline structure can be confirmed by observing the cross section of the rolled aluminum alloy sheet material (2) or the chassis (20) obtained by subjecting the rolled aluminum alloy sheet material (2) to drawing work with a polarizing microscope.

The fibrous crystalline structure is preferably observed on a cross section obtained by cutting the rolled aluminum alloy sheet material in an arbitrary direction, such as 0°, 90°, 45°, and 135°, with respect to the rolling direction thereof. The fibrous crystalline structure can also be observed similarly in the bent portion and the corner portion.

Figure 4A:
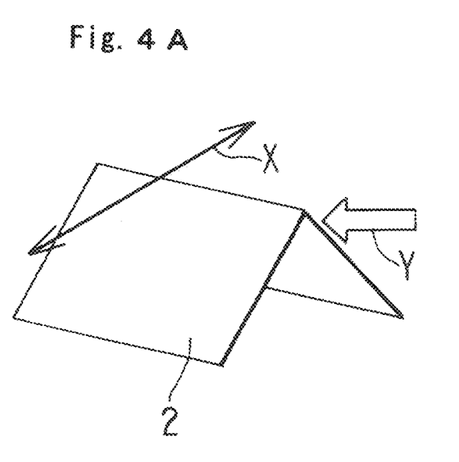
FIGS. 4A and 4B are perspective views showing the cross sectional direction in the observation of the fibrous crystalline structure on the cross section of the rolled aluminum alloy sheet material having been bent.
Figure 4B:
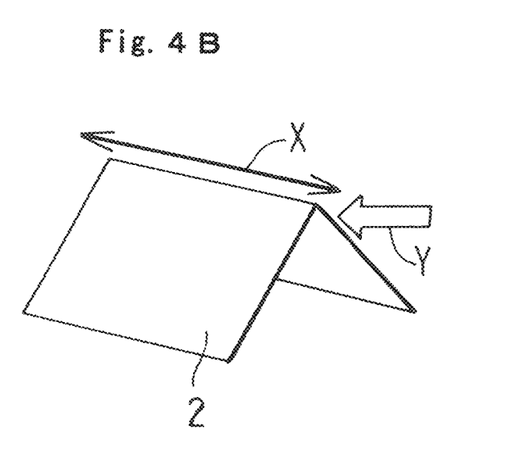
Figure 5:
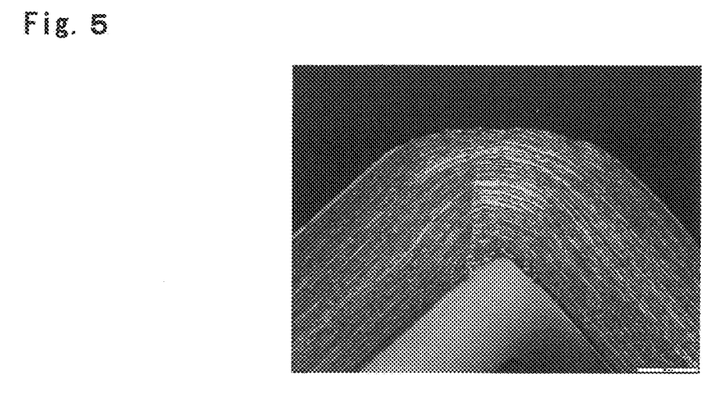
FIG. 5 is a micrograph of the bent material of the rolled aluminum alloy sheet material (internal radius: 0 mm) on the cross section (angle of cross sectional direction with respect to rolling direction: 90°).
Figure 6:
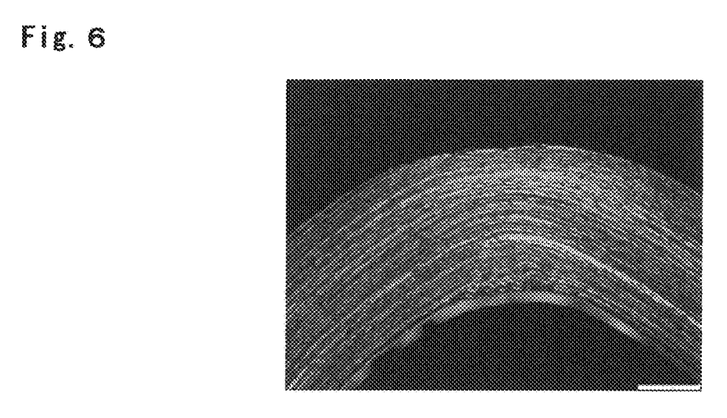
FIG. 6 is a micrograph of the bent material of the rolled aluminum alloy sheet material (internal radius: 0.4 mm) on the cross section (angle of cross sectional direction with respect to rolling direction: 90°).
Figure 7:
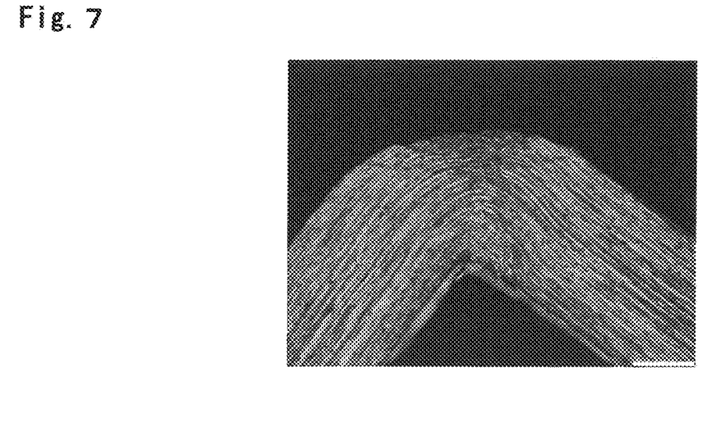
FIG. 7 is a micrograph of the bent material of the rolled aluminum alloy sheet material (internal radius: 0 mm) on the cross section (angle of cross sectional direction with respect to rolling direction: 0°).
Figure 8:
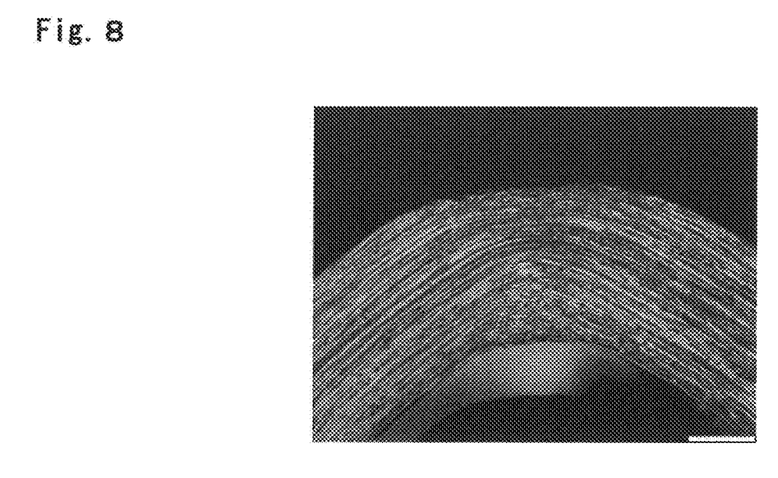
FIG. 8 is a micrograph of the bent material of the rolled aluminum alloy sheet material (internal radius: 0.4 mm) on the cross section (angle of cross sectional direction with respect to rolling direction: 0°).

Specifically, as shown in FIGS. 4A and 4B, for example, the rolled aluminum alloy sheet material (2) having a thickness of 0.25 mm is bent to form an inner curvature of 0 mm or 0.4 mm to provide a bent material, which is observed with a polarizing microscope for the cross section thereof obtained by cutting in a direction (Y) forming an angle of 90° (perpendicular) or 0° (parallel) with respect to the rolling direction (X). It is then found from the micrographs shown in FIGS. 5 to 8 that the fibrous crystalline structure extends in the direction perpendicular to the thickness direction of the sheet material, along the curvature, in all the cross section with an inner curvature of 0 mm and an angle of the direction of the cross section with respect to the rolling direction of 90° (FIG. 5), the cross section with an inner curvature of 0.4 mm and an angle of the direction of the cross section with respect to the rolling direction of 90° (FIG. 6), the cross section with an inner curvature of 0 mm and an angle of the direction of the cross section with respect to the rolling direction of 0° (FIG. 7), and the cross section with an inner curvature of 0.4 mm and an angle of the direction of the cross section with respect to the rolling direction of 0° (FIG. 8).

EXAMPLE

Examples of the invention will be described below. The invention is not construed as being limited to the examples.

Example 1

An aluminum alloy ingot containing from 0.2 to 0.6% by mass of Si, from 0.45 to 0.9% by mass of Mg, 0.35% by mass or less of Fe, 0.1% by mass or less of Cr, and 0.1% by mass or less of Zn, with the balance of Al and unavoidable impurities was homogenized at 580° C. for 10 hours, faced, preliminarily heated to 500° C., and then subjected to hot rolling. In the hot rolling, the starting temperature of the final pass was 400° C., and after the pass, the material was cooled at a rate of 80° C. per minute. Thereafter, the material was subjected to a heat treatment under a condition of 240° C. for 4 hours. Thereafter, the material was subjected to cold rolling at a rolling reduction of 86%. Thus, a rolled aluminum alloy sheet material having a 0.2% proof stress of 310 MPa, a breaking elongation of 7%, and a thickness of 1 mm was obtained.

The observation of the cross section of the sheet material with an optical microscope and a polarizing lens revealed that a fibrous crystalline structure extended in the direction perpendicular to the thickness direction.

A laminated material was obtained by laminating an unstretched polypropylene resin film having a thickness of 30 on one surface of an aluminum foil having a thickness of 120 μm with an adhesive layer containing a poly (ester-urethane) resin and hexamethylene isocyanate, and laminating an unstretched polypropylene resin film having a thickness of 200 μm on the other surface of the aluminum foil with the adhesive layer, and the laminated material was laminated as a covering material on the lower surface of the rolled aluminum alloy sheet material constituting the outer surface of the chassis for a small electronic device with an adhesive layer containing an acrylic adhesive.

A nylon resin film having a thickness of 30 μm was laminated as a covering material on the upper surface of the rolled aluminum alloy sheet material constituting the inner surface of the chassis for a small electronic device with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Example 1.

Example 2

An aluminum alloy ingot containing 0.4% by mass or less of Si, from 0.4 to 0.6% by mass of Mn, from 4.0 to 4.9% by mass of Mg, 0.4% by mass or less of Fe, from 0.05 to 0.25% by mass of Cr, and 0.25% by mass or less of Zn, with the balance of Al and unavoidable impurities was homogenized at 580° C. for 10 hours, faced, preliminarily heated to 500° C., and then subjected to hot rolling. In the hot rolling, the starting temperature of the final pass was 400° C., and after the pass, the material was cooled at a rate of 80° C. per minute. Thereafter, the material was subjected to a heat treatment under a condition of 240° C. for 4 hours. Thereafter, the material was subjected to cold rolling at a rolling reduction of 79%, and then subjected to final annealing at 130° C. for 4 hours. Thus, a rolled aluminum alloy sheet material having a 0.2% proof stress of 210 MPa, a breaking elongation of 7%, and a thickness of 1.5 mm was obtained.

The observation of the cross section of the sheet material with an optical microscope and a polarizing lens revealed that a fibrous crystalline structure extended in the direction perpendicular to the thickness direction.

A nylon resin film having a thickness of 90 μm was laminated as a covering material on both the upper and lower surfaces of the rolled aluminum alloy sheet material with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Example 2.

Example 3

An aluminum alloy ingot containing 0.4% by mass or less of Si, from 2.1 to 2.9% by mass of Mg, 0.5% by mass or less of Fe, from 1.2 to 2.0% by mass of Cu, 0.3% by mass or less of Mn, from 0.18 to 0.28% by mass of Cr, and from 5.1 to 6.1% by mass of Zn, with the balance of Al and unavoidable impurities was rolled under the same processes and conditions as in Example 2, and thus a rolled aluminum alloy sheet material having a 0.2% proof stress of 550 MPa, a breaking elongation of 9%, and a thickness of 1.5 mm was obtained.

The observation of the cross section of the sheet material with an optical microscope and a polarizing lens revealed that a fibrous crystalline structure extended in the direction perpendicular to the thickness direction.

A nylon resin film having a thickness of 90 μm was laminated as a covering material on the lower surface of the rolled aluminum alloy sheet material constituting the outer surface of the chassis for a small electronic device with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Example 3.

Example 4

The same rolled aluminum alloy sheet material as in Example 1 was prepared.

A nylon resin film having a thickness of 90 μm was laminated as a covering material on the lower surface of the rolled aluminum alloy sheet material constituting the outer surface of the chassis for a small electronic device with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Example 4.

Comparative Example 1

An extruded aluminum alloy sheet material formed of an aluminum alloy containing 0.4% by mass or less of Si, from 0.4 to 1.0% by mass of Mn, from 4.0 to 4.9% by mass of Mg, 0.4% by mass or less of Fe, from 0.05 to 0.25% by mass of Cr, and 0.25% by mass or less of Zn, with the balance of Al and unavoidable impurities, having a 0.2% proof stress of 230 MPa, a breaking elongation of 14%, and a thickness of 2 mm was prepared. The sheet material was obtained by extrusion forming, and did not have a fibrous crystalline structure extending in the direction perpendicular to the thickness direction.

A nylon resin film having a thickness of 90 μm was laminated as a covering material on both the upper and lower surfaces of the extruded aluminum alloy sheet material with an adhesive layer containing an acrylic adhesive.

The extruded aluminum alloy laminated sheet material thus obtained was cut into an approximately rectangular shape having a length of 150 mm, a width of 82 mm, and a curvature at corners of 14.5 mm, which was designated as a material for forming of Comparative Example 1.

Comparative Example 2

An extruded aluminum alloy sheet material formed of an aluminum alloy containing 0.4% by mass or less of Si, from 2.1 to 2.9% by mass of Mg, 0.5% by mass or less of Fe, from 1.2 to 2.0% by mass of Cu, 0.3% by mass or less of Mn, from 0.18 to 0.28% by mass of Cr, and from 5.1 to 6.1% by mass of Zn, with the balance of Al and unavoidable impurities, having a 0.2% proof stress of 510 MPa, a breaking elongation of 11%, and a thickness of 1.5 mm was prepared. The sheet material was obtained by extrusion forming, and did not have a fibrous crystalline structure extending in the direction perpendicular to the thickness direction.

The extruded aluminum alloy sheet material thus obtained was cut into an approximately rectangular shape having a length of 150 mm, a width of 82 mm, and a curvature at corners of 14.5 mm, which was designated as a material for forming of Comparative Example 2.

Comparative Example 3

An aluminum alloy ingot containing from 0.2 to 0.6% by mass of Si, from 0.45 to 0.9% by mass of Mg, 0.35% by mass or less of Fe, 0.1% by mass or less of Cr, and 0.1% by mass or less of Zn, with the balance of Al and unavoidable impurities was homogenized at 580° C. for 10 hours, faced, preliminarily heated to 500° C., and then subjected to hot rolling. In the hot rolling, the starting temperature of the final pass was 400° C., and after the pass, the material was cooled at a rate of 80° C. per minute. Thereafter, the material was subjected to a heat treatment under a condition of 240° C. for 4 hours. Thereafter, the material was subjected to cold rolling at a rolling reduction of 57%, and then subjected to a heat treatment at 250° C. for 2 hours. Thus, a rolled aluminum alloy sheet material having a 0.2% proof stress of 150 MPa, a breaking elongation of 14%, and a thickness of 3 mm was obtained. The sheet material was obtained by subjecting to cold rolling and then natural aging, and did not have a fibrous crystalline structure extending in the direction perpendicular to the thickness direction.

A nylon resin film having a thickness of 30 μm was laminated as a covering material on both the upper and lower surfaces of the rolled aluminum alloy sheet material with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Comparative Example 3.

Comparative Example 4

A rolled aluminum alloy sheet material formed of an aluminum alloy containing from 0.2 to 0.6% by mass of Si, from 0.45 to 0.9% by mass of Mg, 0.35% by mass or less of Fe, 0.1% by mass or less of Cr, and 0.1% by mass or less of Zn, with the balance of Al and unavoidable impurities, having a 0.2% proof stress of 145 MPa, a breaking elongation of 12%, and a thickness of 2 mm was prepared. The sheet material was obtained by cold rolling (rolling reduction: 33%) of an extruded sheet material, and did not have a fibrous crystalline structure extending in the direction perpendicular to the thickness direction.

A nylon resin film having a thickness of 30 μm was laminated as a covering material on both the upper and lower surfaces of the rolled aluminum alloy sheet material with an adhesive layer containing an acrylic adhesive.

The rolled aluminum alloy laminated sheet material thus obtained was cut into an approximately rectangular shape having a length of 150 mm, a width of 82 mm, and a curvature at corners of 14.5 mm, which was designated as a material for forming of Comparative Example 4.

Forming of Chassis for Small Electronic Device

The materials for forming of Examples 1 to 4 and Comparative Examples 1 to 4 each were subjected to drawing work by using the drawing apparatus shown in FIGS. 2A and 2B, thereby forming a chassis for a small electronic device having a length of 140.5 mm, a width of 70.5 mm, a height of the side wall (forming height) of 7 mm, and a curvature at the corners of the side wall of 2 mm. The angle of the side wall with respect to the bottom wall was 90°.

The observation of the chassis thus formed revealed that in the chassis using the materials for forming of Examples 1 to 4, no wrinkle or crack was formed on the corner portion of the side wall, and no damage due to the contact with the lower die was observed on the outer surface of the side wall.

In the chassis using the materials for forming of Comparative Examples 1 to 4, wrinkles and cracks were formed on the corner portion of the side wall. In the chassis using the materials for forming of Comparative Examples 1, 3, and 4, no damage was found on the outer surface of the side wall, but in the chassis using the material for forming of Comparative Example 2, damages due to the contact with the lower die were observed on the outer surface of the side wall.

INDUSTRIAL APPLICABILITY

The invention can be favorably applied to forming of a chassis for a small electronic device, such as a tablet terminal, a portable communication terminal device, a notebook computer, a portable telephone, a portable music device, and a digital camera.

What is claimed is:
1. A laminated sheet material for a chassis for an electronic device, the laminated sheet material comprising:
a rolled aluminum alloy sheet material having a thickness of from 0.5 mm to 3.5 mm and a 0.2% proof stress of 200 MPa or more, the rolled aluminum alloy sheet material including a first surface and a second surface opposite to the first surface in a thickness direction, the first surface and the second surface extending along a rolling direction of the rolled aluminum alloy sheet material, the rolled aluminum alloy sheet material having a fibrous crystalline structure extending in a direction orthogonal to the thickness direction when observed in a cross section of the rolled aluminum alloy sheet material, the cross section including fibers of the fibrous crystalline structure extending in the direction orthogonal to the thickness direction;
a first covering material comprising a first stretched synthetic resin film and laminated on the first surface of the rolled aluminum alloy sheet material that is to be an outer surface of the chassis of the electronic device;
a first adhesive layer provided between the rolled aluminum alloy sheet material and the first covering material to adhere to the rolled aluminum alloy sheet material;
a second covering material comprising a second stretched synthetic resin film and laminated on the second sur- face of the rolled aluminum alloy sheet material that is to be an inner surface of the chassis of the electronic device; and a second adhesive layer provided between the rolled aluminum alloy sheet material and the second covering material to adhere to the rolled aluminum alloy sheet material, wherein the first stretched synthetic resin film of the first covering material comprises an oriented film that is peelably provided to the first surface of the rolled aluminum alloy sheet material, wherein the second stretched synthetic resin film of the second covering material comprises a second oriented film that is peelably provided to the second surface of the rolled aluminum alloy sheet material, wherein the first covering material and the second covering material are outermost layers of the laminated sheet material, wherein the first covering material and the second covering material are directly adhered to the rolled aluminum alloy sheet material, wherein the first stretched synthetic resin film and the second stretched synthetic resin film are outermost layers of the laminated sheet material, wherein the first covering material has a tensile strength of from 180 to 330 MPa, a tensile breaking elongation of from 80 to 180%, and a ratio of machine direction (MD)/traverse direction (TD) in tensile strength or tensile breaking elongation in a range of from 0.8 to 1.2, wherein the second covering material includes a film having a Young's modulus of from 30 to 400 MPa, and wherein the oriented film is peelably provided to the first surface of the rolled aluminum alloy sheet material to prevent the first adhesive layer from remaining on a surface of the rolled aluminum alloy sheet material when the oriented film is peeled off the rolled aluminum alloy sheet material.

2. A laminated sheet material according to claim 1, wherein the first covering material further comprises
a first laminated material including a first metal foil, and
a first additional stretched synthetic resin film, the first stretched synthetic resin film and the first additional stretched synthetic resin film sandwiching the first metal foil therebetween.

3. A laminated sheet material according to claim 2, wherein the second covering material further comprises
a second laminated material including a second metal foil, and
a second additional stretched synthetic resin film, the second stretched synthetic resin film and the second additional stretched synthetic resin film sandwiching the second metal foil therebetween.

4. A laminated sheet material according to claim 1, wherein the fibrous crystalline structure extends substantially along the first surface or the second surface.

5. A laminated sheet material according to claim 4, wherein the rolled aluminum alloy sheet material contains an aluminum alloy containing any one of an Al—Mn—Mg alloy containing from 0.2 to 0.7% by mass of Mn and from 2.0 to 5.0% by mass of Mg, with a balance of Al and unavoidable impurities, an Al—Si—Mg alloy containing from 0.2 to 0.8% by mass of Si and from 0.4 to 1.2% by mass of Mg, with the balance of Al and unavoidable impurities, and an Al—Zn—Mg alloy containing from 4.0 to 6.5% by mass of Zn and from 0.5 to 3.0% by mass of Mg, with the balance of Al and unavoidable impurities.

6. A laminated sheet material according to claim 5, wherein the first covering material has a thickness of from 50 to 100 μm.

7. A laminated sheet material according to claim 1, wherein the rolled aluminum alloy sheet material contains an aluminum alloy containing any one of an Al—Mn—Mg alloy containing from 0.2 to 0.7% by mass of Mn and from 2.0 to 5.0% by mass of Mg, with a balance of Al and unavoidable impurities, an Al—Si—Mg alloy containing from 0.2 to 0.8% by mass of Si and from 0.4 to 1.2% by mass of Mg, with the balance of Al and unavoidable impurities, and an Al—Zn—Mg alloy containing from 4.0 to 6.5% by mass of Zn and from 0.5 to 3.0% by mass of Mg, with the balance of Al and unavoidable impurities.

8. A laminated sheet material according to claim 1, wherein the first covering material has a thickness that is from 0.05 to 1.5 times a thickness of the rolled aluminum alloy sheet material.

9. A laminated sheet material according to claim 1, wherein the first covering material has a thickness of from 50 to 100 μm.

10. A laminated sheet material according to claim 1, further comprising:
wherein the second covering material contains a polyethylene resin film, a polypropylene resin film, or a polyamide resin film having a thickness of from 10 to 100 μm.

11. A laminated sheet material according to claim 1, wherein the first adhesive layer is provided between the rolled aluminum alloy sheet material and the first covering material to adhere to the rolled aluminum alloy sheet material with an adhesive force of from 1 to 10 N/25 mm according to the 180° peeling adhesive force based on JIS Z0237:2000.

12. A laminated sheet material according to claim 1, wherein the first adhesive layer is provided between the rolled aluminum alloy sheet material and the first covering material to adhere to the rolled aluminum alloy sheet material with an adhesive force of from 0.5 to 15 N/25 mm according to 180° peeling adhesive force based on JIS Z0237:2000.

13. A laminated sheet material according to claim 1, wherein the rolled aluminum alloy sheet material is a cold rolled aluminum alloy sheet material.

14. A laminated sheet material according to claim 1, wherein the rolled aluminum alloy sheet material has a breaking elongation of 5% or more and 20% or less.

15. A laminated sheet material according to claim 1, wherein the rolled aluminum alloy sheet material has a homogeneous deposit of $Mg_2Si$.

16. A laminated sheet material according to claim 1, wherein the oriented film is constituted by a biaxially stretched polyethylene terephthalate resin film, a biaxially stretched polyethylene naphthalate resin film, or a biaxially stretched 6-nylon resin film.

17. A laminated sheet material according to claim 1, wherein the first adhesive layer is a urethane adhesive, an acrylic adhesive, or a rubber adhesive.

* * * * *